US007208850B2

(12) United States Patent
Turner

(10) Patent No.: US 7,208,850 B2
(45) Date of Patent: Apr. 24, 2007

(54) POWER STRIP TRANSFER MECHANISM

(75) Inventor: Chris Turner, Whitewater, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 558 days.

(21) Appl. No.: 10/653,366

(22) Filed: Sep. 2, 2003

(65) Prior Publication Data

US 2005/0047034 A1 Mar. 3, 2005

(51) Int. Cl.
*H02J 7/00* (2006.01)

(52) U.S. Cl. .......................................... 307/64; 307/23

(58) Field of Classification Search .................. 307/18, 307/23, 29, 80, 38, 39, 64; 700/286, 297
See application file for complete search history.

(56) References Cited

U.S. PATENT DOCUMENTS 5,268,850 A * 12/1993 Skoglund .................... 700/297
6,166,525 A * 12/2000 Crook ......................... 322/11
6,172,432 B1 * 1/2001 Schnackenberg et al. ..... 307/23
6,369,463 B1 * 4/2002 Maiorano .................... 307/66
2002/0084697 A1 * 7/2002 Radusewicz ................. 307/64
2002/0117900 A1 * 8/2002 Perttu .......................... 307/64
2004/0124710 A1 * 7/2004 Pfeiffer ........................ 307/64
2004/0172204 A1 * 9/2004 Eaton et al. .................. 702/57

* cited by examiner

*Primary Examiner*—Chau N. Nguyen
*Assistant Examiner*—Daniel Cavallari
(74) *Attorney, Agent, or Firm*—Boyle Fredrickson Newholm Stein & Gratz S.C.

(57) ABSTRACT

A transfer switch is provided for transferring the supply of electrical power to a load between a utility source and a generator that generates electrical power when started. The transfer switch includes a transfer relay that selectively connects the load to one of the utility source and the generator in response to the application of electrical power on the coil of the transfer relay by the generator. A generator relay having a coil operatively connected to the utility source is also provided. The generator relay provides a signal to the generator to start in response to the absence of electrical power on the coil of the generator relay by the utility source.

18 Claims, 3 Drawing Sheets

POWER STRIP TRANSFER MECHANISM

FIELD OF THE INVENTION

This invention relates generally to stand-by electrical generators, and in particular, to a transfer mechanism for transferring the supply of electrical power to essential devices in a residential home between a utility source and a stand-by electrical generator.

BACKGROUND AND SUMMARY OF THE INVENTION

As is known, virtually all residential homes utilize electrical power received from a utility company. Typically, utility companies have an excellent record of providing uninterrupted or infrequently interrupted power to their customers at proper voltage levels and line frequency. However, due to the increasing demand for power, power outages have become more frequent. While power outages usually last only for a short duration, an extended power outage may cause more than simple aggravation for customers of the utility. A power outage may render a homeowner's appliances, such as the sump pump, refrigerator or freezer inoperable. If a power outage occurs during a rainstorm, the failure of the sump pump to operate may result in the flooding of the homeowner's basement.

In order to combat these occasional disruptions in service, many residential customers of the utility companies have equipped their homes with stand-by electrical generator systems. These stand-by electrical generator systems include internal combustion engines that drive electrical generators. If the commercial power from the utility company fails, the internal combustion engine of the stand-by electrical generator system is automatically started causing the electrical generator to generate electrical power. When the electrical power generated by the electrical generator reaches the proper voltage and frequency desired by the customer, a transfer mechanism transfers the load imposed by the homeowner from the commercial power lines to the electrical generator.

Typically, the transfer mechanism incorporates switches that isolate the electrical power supplied by the utility company from the generator. In a residential application, the switches are flipped either manually or automatically between the utility source and the generator in order to provide power to the electrical system of the home. These prior art transfer mechanisms often require a homeowner to transfer the entire electrical system of the home onto the generator. Such an arrangement does not provide the homeowner with the ability to decide which circuits of the home's electrical system are to be powered. It can be appreciated that the demands of the entire electrical system of the home can be quite significant. As a result, the generator must be of sufficient size to power the entire electrical system of the home. This, in turn, increases the overall cost of the stand-by electrical generator system for the homeowner. Further, prior stand-by electrical generator systems require that the transfer mechanism to be interconnected to the utility source, the generator and the electrical system of the home. This usually requires the homeowner to employ an electrical contractor to make the necessary connections. Once again, the hiring of an electrical contractor increases the overall cost to the homeowner for a stand-by electrical generator system.

Therefore, it is a primary object and feature of the present invention to provide a transfer mechanism that transfers the electrical power supplied to essential devices within a residential home between a utility source and stand-by electrical generator.

It is a further object and feature of the present invention to provide a transfer mechanism that automatically transfers the electrical power supplied to essential devices within a residential home from a utility source to a stand-by electrical generator in response to a power outage.

It is a still further object and feature of the present invention to provide a transfer mechanism for transferring the electrical power supplied to essential devices within a residential home between a utility source and a stand-by electrical generator that may be simply and easily installed by a homeowner.

In accordance with the present invention, a transfer switch is provided for transferring the supply of electrical power to a load between a utility source and a generator that generates electrical power when started. The transfer switch includes a transfer relay having a utility input, generator input, an output and a coil operatively connected to the generator. The output of the transfer relay is selectively connected to one of the utility input and the generator input in response to the application of electrical power to the coil by the generator. A power cord interconnects the utility input of the transfer relay to the utility source. The power cord has a first end terminating in an electrical plug receivable within an electrical outlet electrically connected to the utility source and a second end electrically connected to the utility input of the transfer relay. A generator cord electrically connects the generator to the generator input of the relay. A first duplex outlet is electrically connected to the output of the relay. The outlet is adapted for receiving an electrical plug for the load therein.

The transfer switch may also include a second duplex outlet electrically connected to the generator. The second duplex outlet is adapted for receiving the electrical plug for the load therein. A manual exercise switch connectable to the generator may also be provided. The manual exercise switch is movable between a first non-actuated position and a second actuated position for starting the generator. A generator control structure is operatively connected to the utility source and to the generator. The generator control structure includes a generator relay having a first contact connected to the generator, a second contact connected to the generator and a coil connected to the utility source. The generator relay is movable between an open arrangement wherein the first and second contacts are isolated from each other and a closed arrangement wherein the first and second contacts are electrically coupled in response to the absence of electrical power on the coil by the utility source. The generator control structure may also include a starting relay having a first contact connected to the generator, a second contact connected to the coil of the transfer relay and a coil connected to the utility source. The starting relay is movable between an open arrangement wherein the first and second contacts are isolated from each other and a closed arrangement wherein the first and second contacts are electrically coupled in response to the absence of electrical power on the coil by the utility source.

The transfer switch may also include a utility display device connectable to the utility source. The utility display device generates a visual display in response to the application of electrical power by the utility source. Similarly, a generator display device is connected to the generator source. The generator display device generates a visual display in response to the application of electrical power by the generator.

In accordance with the present invention, a transfer switch is provided for transferring electrical power to a load between a utility source and a generator that generates electrical power when started. The transfer switch includes the transfer relay having a utility input, generator input, an output, and a coil operatively connected to the generator. The output is selectively connected to one of the utility input and the generator input in response to the application of electrical power on the coil by the generator. The transfer switch also includes a generator relay having a first contact connected to the generator, a second contact connected to the generator and a coil connected to the utility source. The generator relay is movable between an open arrangement wherein the first and second contacts are isolated from each other and a closed arrangement wherein the first and second contacts are electrically coupled in response to the absence of electrical power on the coil by the utility source. A first duplex outlet is electrically connected to the output of the transfer relay. The first duplex outlet is adapted for receiving an electrical plug for the load therein.

A power cord interconnects the utility input of the transfer relay to the utility source. The power cord has a first end terminating at an electrical plug that is receivable within an electrical outlet electrically connected to the utility source and a second end electrically connected to the utility input of the transfer relay. A second duplex outlet is electrically connected to the generator. The second duplex outlet is adapted for receiving the electrical plug for the load therein. A manual exercise switch is also connectable to the generator. The manual exercise switch is movable between a first non-actuated position and a second actuated position for starting the generator.

The transfer switch may also include a starting relay having a first contact connected to the generator, a second contact connected to the coil of the transfer relay and a coil connected to the utility source. The starting relay is movable between an open arrangement wherein the first and second contacts are isolated from each other and a closed arrangement wherein the first and second contacts are electrically coupled in response to the absence of electrical power on the coil of the starting realy by the utility source. A utility display device is also connected to the utility source. The utility display device generates a visual signal in response to the application of electrical power by the utility source. In addition, a generator display device is connected to the generator source. The generator display device generates a visual display in response to the application of electrical power by the generator.

In accordance with a still further aspect of the present invention, a transfer switch is provided for transferring the supply of electrical power to a load between a utility source and a generator that generates electrical power when started. The transfer switch includes a transfer relay having a utility input, a generator input, an output, and a coil operatively connected to the generator. The output of the transfer relay is selectively connected to one of the utility input and the generator input in response to the application of electrical power upon the generator. A power cord has a first end terminating at an electrical plug that is receivable within the electrical outlet electrically connected to the utility source and a second end electrically connected to the utility input of the transfer relay. A first duplex outlet is electrically connected to the output of the transfer relay. The first duplex outlet is adapted for receiving an electrical plug for the load therein. The second duplex outlet is electrically connected to the generator. The second duplex outlet is also adapted for receiving the electrical plug for the load therein.

The transfer switch may also include a generator relay having a first contact connected to the generator, a second contact connected to the generator and a coil connected to the utility source. The generator relay is movable between an open arrangement wherein the first and second contacts are isolated from each other and a closed arrangement wherein the first and second contacts are electrically coupled in response to the absence of electrical power on the coil by the utility source. A manual exercise switch is connected to the generator. The manual exercise switch is movable between the first non-actuated position and a second actuated position for starting the generator. The transfer switch also includes a starting relay having a first contact connected to the generator, a second contact connected to the coil of the transfer relay and a coil connected to the utility source. The starting relay is movable between an open arrangement wherein the first and second contacts are isolated from each other and a closed arrangement wherein the first and second contacts are electrically coupled in response to the absence of electrical power on the coil by the utility source. A utility display device is connectable to the utility source. The utility display device generates a visual display in response to the application of electrical power by the utility source. A generator display device is connectable to the generator. The generator display device generates visual display in response to application of electrical power by the generator.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE INVENTION

Figure 1:
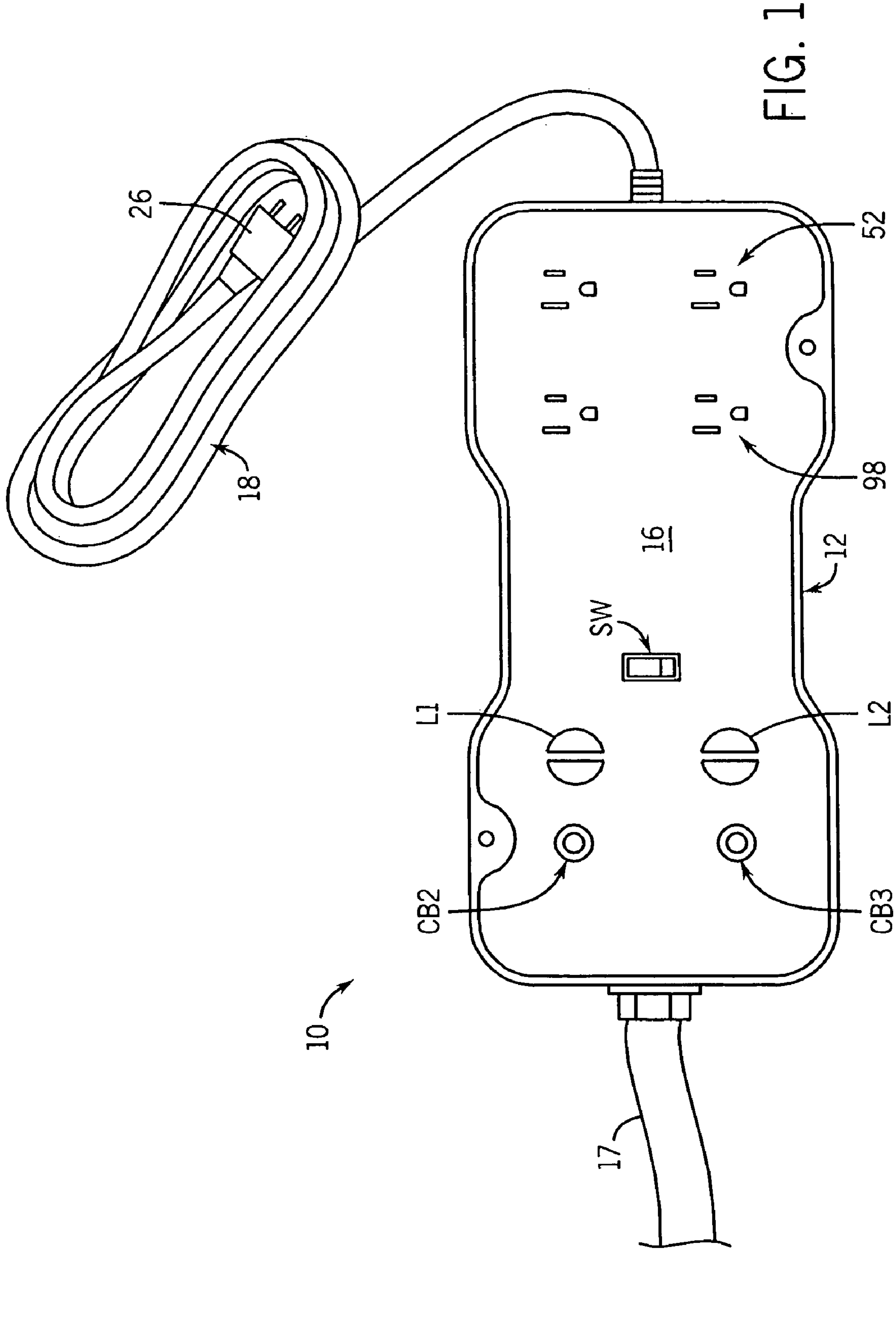
FIG. 1 is a top plan view of a transfer mechanism in accordance with the present invention.
Figure 2:
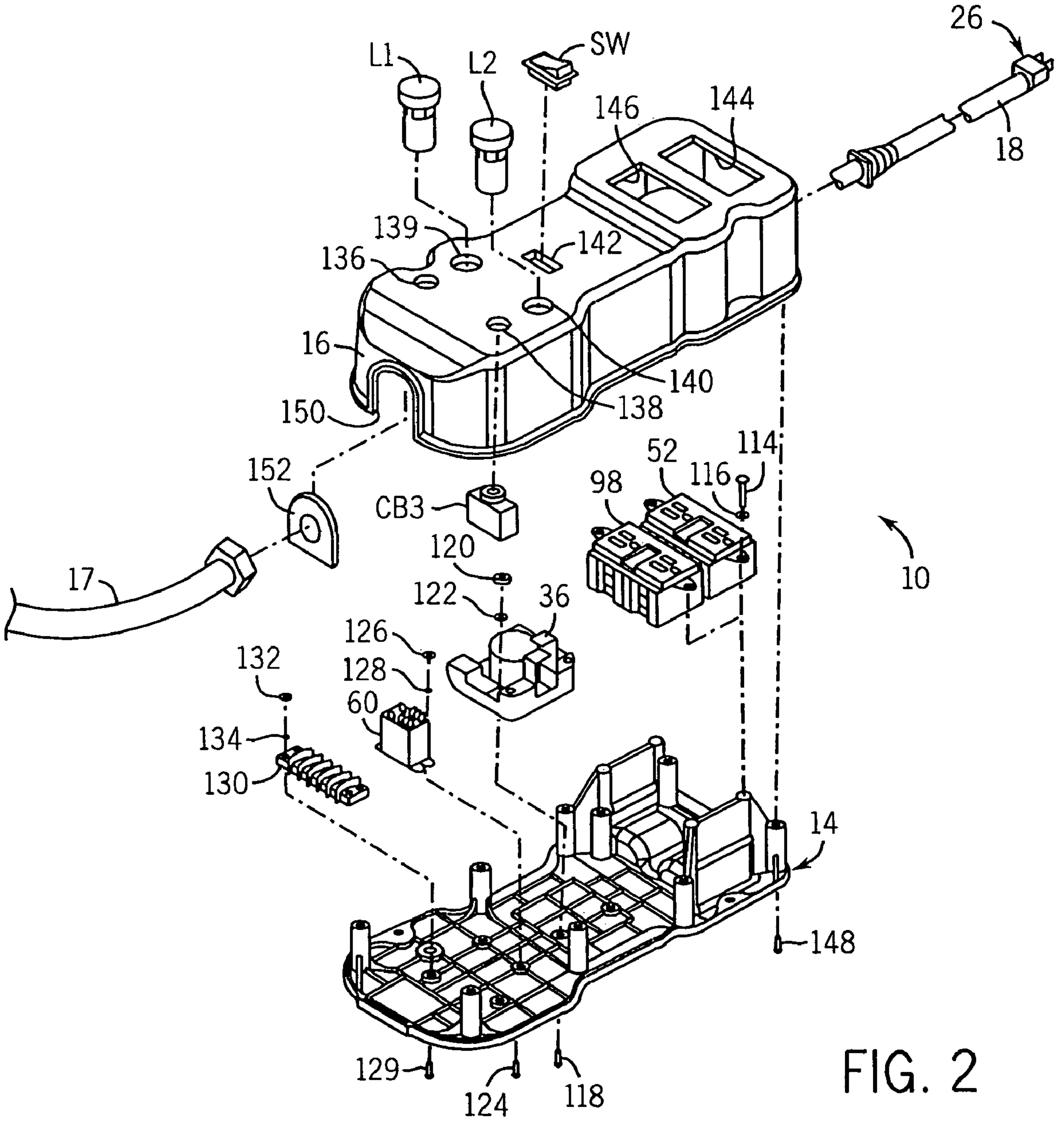
FIG. 2 is an exploded view of a transfer mechanism in accordance with the present invention.

Referring to FIGS. 1 and 2, a transfer mechanism in accordance with the present invention is generally designated by the reference numeral 10. It is contemplated that transfer mechanism 10 include housing 12 defined by base 14 and cover 16. It is intended that housing 12 house the component parts of transfer mechanism 10, as hereinafter described.

Figure 3:
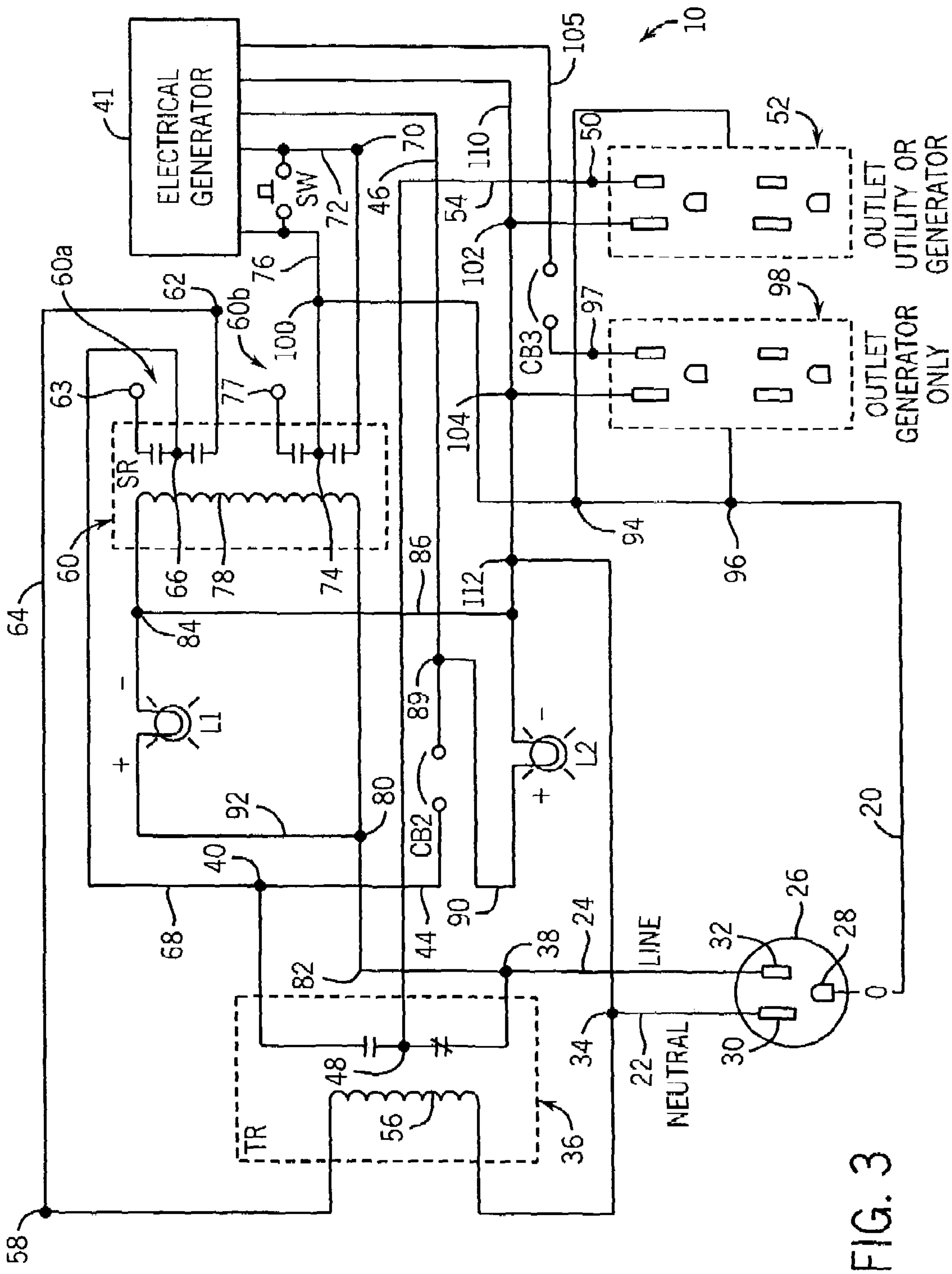
FIG. 3 is a schematic diagram of the transfer mechanism of the present invention.

Referring to FIGS. 2 and 3, transfer mechanism 10 includes generator cord 17 and power cord 18 comprising ground line 20, neutral line 22 and hot line 24. Plug 26 is electrically coupled to a first end of power cord 18 such that ground terminal 28 of plug 26 is connected to ground wire 20 of power cord 18; neutral terminal 30 of plug 26 is connected to neutral line 22 of power cord 18; and hot terminal 32 of plug 26 is connected to hot line 24 of power cord 20. Ground terminal 28, neutral terminal 30 and hot terminal 32 of plug 26 are configured for receipt in a standard three-prong wall outlet (not shown) in the United States. As is conventional, the wall outlet is connected to a source of electrical power as provided by a utility.

Neutral line 22 of power cord 18 is connected to neutral terminal 34 of single pole, double throw, transfer relay 36.

Transfer relay 36 includes a normally closed terminal that defines utility input terminal 38, a normally open terminal that defines generator input terminal 40; and a common terminal that defines output terminal 48. Utility input terminal 38 is electrically connected to hot line 24 of power cord 18; generator input terminal 40 is electrically connected to electrical generator 41 through line 44 circuit breaker CB2 and line 46; and output terminal 48 is interconnected to hot terminal 50 of first duplex outlet 52 by line 54. By way of example, first duplex outlet 52 may take the form of a ground fault circuit interrupter outlet, but other outlets may be used without deviating from the scope of the present invention.

Transfer relay 36 also includes magnetic coil 56 having input 58 connected to double pole, double throw relay 60 by line 64, as hereinafter described, and an output electrically connected to neutral terminal 34. As is conventional, output terminal 48 is normally connected to utility input terminal 38 by a movable contact. As the current flows through magnetic coil 56 of transfer relay 36, magnetic coil 56 becomes energized so as to attract and move the movable contact. As a result, the movable contact within transfer relay 36 disengages from utility input terminal 38 and becomes electrically coupled to generator input terminal 40 so as to operatively connect generator input terminal 40 to output terminal 48. If flow of current through magnetic coil 56 is stopped, the movable contact within transfer relay 36 returns to its original position such that utility input terminal 38 is electrically coupled to output terminal 48 of transfer relay 36.

Double pole, double throw relay 60 includes first and second relays 60*a* and 60*b*, respectively, and a magnetic coil 78. First relay 60*a* includes first normally closed terminal 62 connected to input 58 of magnetic coil 56 of transfer relay 36 by line 64; first normally open terminal 63; and first common terminal 66 connected to generator input terminal 40 of transfer relay 36 by line 68. Second relay 60*b* of double pole, double throw relay 60 includes second normally closed terminal 70 that communicates with the electrical generator on line 72; second common terminal 74 that communicates with the electrical generator on line 76; and second normally open terminal 77. Line 72 and line 76 are interconnected by manual exercise switch SW, for reasons hereinafter described.

Magnetic coil 78 of a double pole, double throw relay 60 has an input 80 connected to utility input terminal 38 of transfer relay 36 by line 82 and an output 84 connectable with the negative terminal of utility running light L1 and with the negative terminal of generator running light L2 through line 86. The positive terminal of utility running light L1 is connected to input 80 of magnetic coil 78 of double pole, double throw relay 60 by line 92. The positive terminal of generator running light L2 is connected to line 46 at node 89 by line 90.

As is conventional, operation of first and second relays 60*a* and 60*b*, respectively, of double pole, double throw relay 60 is controlled by magnetic coil 78. When current does not flow through magnetic coil 78 of double pole, double throw relay 60, first and second relays 60*a* and 60*b*, respectively, are normally closed such that first and second common terminals 66 and 74, respectively, are electrically connected to corresponding first and second normally closed terminals 62 and 70, respectively, by corresponding movable contacts. When current flows through magnetic coil 78, first and second relays 60*a* and 60*b*, respectively, become open such that the movable contacts of relays 60*a* and 60*b*, respectively, of double pole, double throw relay 60 disengage first and second normally closed terminals 62 and 70, respectively, from corresponding first and second common terminals 66 and 74, respectively, and electrically couple first and second common terminals 66 and 74, respectively, to corresponding first and second normally open terminals 63 and 77, respectively. When the flow of current through magnetic coil 78 of double pole, double throw relay 60 is stopped, the movable contacts return to their original position thereby electrically coupling first and second normally closed terminals 62 and 70, respectively, with corresponding first and second common terminals 66 and 74, respectively.

First and second duplex outlets 52 and 98, respectively, of transfer mechanism 10 include corresponding hot terminals 50 and 97, respectively, neutral terminals 102 and 104, respectively, and ground terminals 94 and 96, respectively, for supplying electrical power thereto. As heretofore described, hot terminal 50 of first duplex outlet 52 is interconnected to output terminal 48 of transfer relay 36. Hot terminal 97 of second duplex outlet 98 is connected to electrical generator 41 through circuit breaker CB3 and line 105.

Ground terminals 94 and 96 of first and second duplex outlets 52 and 98, respectively, are interconnected to ground line 20 of power cord 18. Ground line 20 of power cord 18 is also connected to line 76 at node 100. Neutral terminals 102 and 104 of first and second duplex outlets 52 and 98, respectively, are interconnected to neutral line 110 which, in turn, has a first end connected to neutral terminal 34 of transfer relay 36 and a second end connected to negative terminal of generator running light L2 at node 112.

Referring to FIG. 2, in order to assembly transfer mechanism 10, first and second duplex outlets 52 and 98, respectively, are positioned on base 14 of housing 12 and interconnected thereto by screw and washer combination 114 and 116, respectively, that extend through a corresponding ear in first and second duplex outlets 52 and 58, respectively, and into a threaded passageway in base 14. Screw 118 extends through base 14 and transfer relay 36. Nut and washer 120 and 122, respectively, are threaded onto screw 118 to mount to transfer relay 36 on base 14. Similarly, screw 124 extends through base 14 and through double pole, double throw relay 60. Nut and washer 126 and 128, respectively, are threaded onto screw 124 to interconnect double pole, double throw relay 60 to base 14. Finally, screw 129 extends through base 14 and mounting block 130. Mounting block 130 is provided to facilitate the connection of generator cord 17 and the electrical components of transfer mechanism 10, as heretofore described. It can be appreciated that generator cord 17 includes lines, 46, 72, 76, 105 and 110, as described. Nut and washer 132 and 134, respectively, may be threaded on screw 129 in order to mount mounting bracket 130 on base 14. It is contemplated to utilize multiple screws, nuts and washers to connect each of the components to base 14 without deviating from the scope of the present invention.

Cover 16 of housing 12 includes openings 136 and 138 for receiving circuit breakers CB2 and CB3, respectively, therein to provide a homeowner access thereto. In addition, cover 16 of housing 12 includes openings 139 and 140 for receiving utility running light L1 and generator running L2 in order to provide a user visual access thereto. Opening 142 in cover 16 receives manual exercise switch SW therein, and first and second duplex outlet openings 144 and 146, respectively, in cover 16 provide user access to first and second duplex outlets 52 and 98, respectively. Cover 16 may be positioned on base 14 and screw 148 may be threaded therebetween to interconnect cover 16 and base 14, and to maintain the configuration of housing 12. Generator cord 17 extends through recess 150 in cover 16 and is maintained therein by end panel 152. It is understood that housing 12 provides an electrically isolated enclosure for all of the components of transfer mechanism 10 heretofore described.

In operation, electrical generator 41 is initially maintained in a stand-by mode and is not running. Terminals 28, 30 and 32 of electrical plug 26 are inserted into a standard three-prong outlet such that electrical power from the utility source travels on power cord 18 to transfer mechanism 10. It can be appreciated with the electrical generator in its stand-by mode, no electrical power is generated thereby. When electrical power is provided by the utility source, transfer relay 36 will be in its normally closed position such that electrical power supplied by utility source will flow through transfer relay 36 from utility input terminal 38 to output terminal 48 which, in turn, provides electrical power to hot terminal 50 of first duplex outlet 52. In addition, magnetic coil 78 of double pole, double throw relay 60 becomes energized thereby opening the movable contacts of first and second relays 60*a* and 60*b*, respectively, of double pole, double through relay 60 such that first common terminal 66 of relay 60*a* is electrically coupled to first normally open terminal 63 and such that second common terminal 74 is electrically coupled to second normally open terminal 77. With relay 60*b* open, the generator remains in its stand-by mode. In addition, the electrical power supplied by the utility source illuminates the utility running light L1.

In the event of a power outage from the utility source, utility running light L1 goes dark and magnetic coil 78 of double pole, double throw relay 60 is de-energized. With magnetic coil 78 of double pole, double throw relay 60 de-energized, relays 60*a* and 60*b* close such that lines 72 and 76 communicate with each other through relay 60*b* of double pole, double throw relay 60 thereby sending a signal to electrical generator 41 instructing electrical generator 41 to start. As electrical generator 41, begins generating electrical power, such electrical power flows through relay 60*a* of double pole, double throw relay 60 and energizes magnetic coil 56 of transfer relay 36. With magnetic coil 56 of transfer relay 36 energized, output terminal 48 of transfer relay 36 becomes disengaged from utility input terminal 38 and electrically coupled to generator input terminal 40 so as to operatively connect hot terminal 50 of first duplex outlet 52 to electrical generator 41. In addition, electrical generator 41 provides electrical power to hot terminal 97 of second duplex outlet 98. It can be appreciated that first duplex outlet 52 may be used to provide electrical power to essential devices within a residential home, such as a sump pump or a freezer, since transfer mechanism 10 of the present invention seamlessly transfers the supply of electrical power from the utility source to electrical generator 41 in the event of a power outage. During a power outage, second duplex outlet 98 may be used to power other appliances as a homeowner seems fit in order to improve the standard of living during a power outage. Generator running light L2 is illuminated whenever electrical generator 41 is running to provide a homeowner with a visual indication that a power outage has occurred and that electrical generator 41 is operational.

When the power outage ends and the supply of electrical power from the utility returns, magnetic coil 78 of double pole, double throw relay 60 is energized so as to open first and second normally closed relays 60*a* and 60*b*, respectively. With relays 60*a* and 60*b* of double pole, double throw relay 60 open, lines 72 and 76 are no longer in communication thereby advising electrical generator 41 to shut down. In addition, with relay 60*a* of double pole, double throw relay 60 open, magnetic coil 56 of transfer relay 36 is de-energized such that output terminal 48 of transfer relay 36 disengages from generator input terminal 40 and is, once again, electrically coupled to utility input terminal 38 thereby connecting hot terminal 50 of first duplex outlet 52 to the utility source. In addition, utility running light L1 is illuminated. With electrical generator 41 stopped, electrical power is no longer supplied to second outlet 98 or to generator running light L2. As a result, second duplex outlet 98 can no longer be used to power appliances in the home and generator running light L2 is no longer illuminated.

In order to insure proper operation of electrical generator 41, it is contemplated to start the engine of the electrical generator 41 at predetermined time intervals between power outages. By closing the manual exercise switch SW, a homeowner may simulate the appearance a power outage by the utility to electrical generator 41. As a result, the engine, and hence electrical generator 41, will start upon closure of manual exercise switch SW and run for a predetermined period of time. Thereafter, electrical generator 41 will shut down. When electrical generator 41 is exercising, as heretofore described, both the utility running light L1 and the generator running light L2 will be illuminated. In addition, while the first duplex outlets will be supplied with electrical power from the utility source, the second duplex outlets 98 will be supplied with electrical power from electrical generator 41.

Various modes of carrying out the invention are contemplated as being within the scope of the following claims particularly pointing and distinctly claiming the subject matter that is regarded as the invention.

I claim:

1. A transfer switch for transferring the supply of electrical power to a load between a utility source and a generator that generates electrical power when started, the transfer switch comprising:

a transfer relay having an utility input, a generator input, an output, and a coil operatively connected to the generator, wherein the output is selectively connected to one of the utility input and the generator input in response to the application of electrical power on the coil by the generator;

a power cord having a first end terminating at an electrical plug receivable within an electrical outlet electrically connected to the utility source and a second end electrically connected to the utility input of the transfer relay;

a generator cord for electrically connecting the generator to the generator input of the relay;

a first duplex outlet electrically connected to the output of the relay, the first duplex outlet being adapted for receiving an electrical plug for the load therein; and a generator control structure operatively connected to the utility source and the generator, the generator control structure:

providing a signal to start the generator in response to the absence of electrical power from the utility source; and including a generator relay having a first contact connected to the generator, a second contact connected to the generator and a coil connected to the utility source, the generator relay being movable between an open arrangement wherein the first and second contacts are isolated from each other and a closed arrangement wherein the first and second contacts are electrically coupled in response to the absence of electrical power on the coil by the utility source.

2. The transfer switch of claim 1 further comprising a second duplex outlet electrically connected to the generator, the second duplex outlet adapted for receiving the electrical plug for the load therein.

3. The transfer switch of claim 1 further comprising a manual exercise switch connectable to the generator, the manual exercise switch movable between a first non-actuated position and a second actuated position for starting the generator.

4. The transfer switch of claim 1 further comprising a utility display device connectable to the utility source, the utility display device generating a visual display in response to the application of electrical power by the utility source.

5. The transfer switch of claim I further comprising a generator display device connectable to the generator source, the generator display device generating a visual display in response to the application of electrical power by the generator.

6. A transfer switch for transferring the supply of electrical power to a load between a utility source and a generator that generates electrical power when started, the transfer switch comprising:

a transfer relay having an utility input, a generator input, an output, and a coil operatively connected to the generator, the output is selectively connected to one of the utility input and to the generator input in response to the application of electrical power on the coil by the generator;

a generator relay having a first contact connected to the generator, a second contact connected to the generator and a coil connected to the utility source, the generator relay being movable between an open arrangement wherein the first and second contacts are isolated from each other and a closed arrangement wherein the first and second contacts are electrically coupled in response to the absence of electrical power on the coil by the utility source; and a first duplex outlet electrically connected to the output of the transfer relay, the first duplex outlet adapted for receiving an electrical plug for the load therein.

7. The transfer switch of claim 6 further comprising a power cord having a first end terminating at an electrical plug receivable within an electrical outlet electrically connected to the utility source and a second end electrically connected to the utility input of the transfer relay.

8. The transfer switch of claim 6 further comprising a second duplex outlet electrically connected to the generator, the second duplex outlet adapted for receiving the electrical plug for the load therein.

9. The transfer switch of claim 6 further comprising a manual exercise switch connectable to the generator, the manual exercise switch movable between a first non- actuated position and a second actuated position for starting the generator.

10. The transfer switch of claim 6 further comprising a starting relay having a first contact connected to the generator, a second contact connected to the coil of the transfer relay and a coil connected to the utility source, the starting relay movable between an open arrangement wherein the first and second contacts are electrically isolated and a closed arrangement wherein the first and second contacts are electrically coupled in response to the absence of electrical power on the coil by the utility source.

11. The transfer switch of claim 6 further comprising a utility display device connectable to the utility source, the utility display device generating a visual display in response to the application of electrical power by the utility source.

12. The transfer switch of claim 6 further comprising a generator display device connectable to the generator source, the generator display device generating a visual display in response to the application of electrical power by the generator.

13. A transfer switch for transferring the supply of electrical power to a load between a utility source and a generator that generates electrical power when started, the transfer switch comprising:

a transfer relay having an utility input, a generator input, an output, and a coil operatively connected to the generator, the output being selectively connected to one of the utility input and the generator input in response to the application of electrical power on the coil by the generator;

a power cord having a first end terminating at an electrical plug receivable within an electrical outlet electrically connected to the utility source and a second end electrically connected to the utility input of the transfer relay;

a first duplex outlet electrically connected to the output of the transfer relay, the first duplex outlet adapted for receiving an electrical plug for the load therein;

a second duplex outlet electrically connected to the generator, the second duplex outlet adapted for receiving the electrical plug for the load therein; and a generator relay having a first contact connected to the generator, a second contact connected to the generator and a coil connected to the utility source, the generator relay being movable between an open arrangement wherein the first and second contacts are isolated from each other and a closed arrangement wherein the first and second contacts are electrically coupled in response to the absence of electrical power on the coil by the utility source.

14. The transfer switch of claim 13 further comprising a manual exercise switch connectable to the generator, the manual exercise switch movable between a first non- actuated position and a second actuated position for starting the generator.

15. The transfer switch of claim 13 further comprising a utility display device connectable to the utility source, the utility display device generating a visual display in response to the application of electrical power by the utility source.

16. The transfer switch of claim 13 further comprising a generator display device connectable to the generator, the generator display device generating a visual display in response to the application of electrical power by the generator.

17. A transfer switch for transferring the supply of electrical power to a load between a utility source and a generator that generates electrical power when started, the transfer switch comprising:

a transfer relay having an utility input, a generator input, an output, and a coil operatively connected to the generator, wherein the output is selectively connected to one of the utility input and the generator input in response to the application of electrical power on the coil by the generator;

a power cord having a first end terminating at an electrical plug receivable within an electrical outlet electrically connected to the utility source and a second end electrically connected to the utility input of the transfer relay;

a generator cord for electrically connecting the generator to the generator input of the relay;

a first duplex outlet electrically connected to the output of the relay, the first duplex outlet being adapted for receiving an electrical plug for the load therein; and a generator control structure operatively connected to the utility source and the generator, the generator control structure:

providing a signal to start the generator in response to the absence of electrical power from the utility source; and including a generator relay having a first contact connected to the generator, a second contact connected to the generator and a coil connected to the utility source, the generator relay being movable between an open arrangement whereby the first and second contacts are isolated from each other and a closed arrangement wherein the first and second contacts are electrically coupled in response to the absence of electrical power on the coil by the utility source.

18. A transfer switch for transferring the supply of electrical power to a load between a utility source and a generator that generates electrical power when started, the transfer switch comprising:

a transfer relay having an utility input, a generator input, an output, and a coil operatively connected to the generator, the output being selectively connected to one of the utility input and the generator input in response to the application of electrical power on the coil by the generator;

a power cord having a first end terminating at an electrical plug receivable within an electrical outlet electrically connected to the utility source and a second end electrically connected to the utility input of the transfer relay;

a first duplex outlet electrically connected to the output of the transfer relay, the first duplex outlet adapted for receiving an electrical plug for the load therein;

a second duplex outlet electrically connected to the generator, the second duplex outlet adapted for receiving the electrical plug for the load therein; and a starting relay having a first contact connected to the generator, a second contact connected to the coil of the transfer relay and a coil connected to the utility source, the starting relay movable between an open arrangement wherein the first and second contacts are electrically isolated and a closed arrangement wherein the first and second contacts are electrically coupled in response to the absence of electrical power on the coil by the utility source.

* * * * *